G. W. BUSH.
MEANS EMPLOYED IN COLLECTION SYSTEMS.
APPLICATION FILED AUG. 9, 1920.

1,419,815.

Patented June 13, 1922.
2 SHEETS—SHEET 1.

G. W. Bush
INVENTOR

BY Victor J. Evans
ATTORNEY

UNITED STATES PATENT OFFICE.

GEORGE W. BUSH, OF COVINGTON, KENTUCKY.

MEANS EMPLOYED IN COLLECTION SYSTEMS.

1,419,815.

Specification of Letters Patent. Patented June 13, 1922.

Application filed August 9, 1920. Serial No. 402,234.

*To all whom it may concern:*

Be it known that I, GEORGE W. BUSH, a citizen of the United States, residing at Covington, in the county of Kenton and State of Kentucky, have invented new and useful Improvements in Means Employed in Collection Systems, of which the following is a specification.

This invention relates to collection systems for insurance debits, installment houses, lodge and rent receipts, and the like, and has for its object the provision of an improved system involving the making of receipts in duplicate, two receipts being identical, one being formed as a duplicate of the other, the original being given to the person making the payment, the duplicate being turned in at the home office by the collector, and the stub to be retained by the collector for his personal record and being subsequently entered in a route book carried by the collector.

Another object is the provision of a system of this character which embodies the use of an envelope remaining in the possession of the person making the payment and adapted to contain the receipt given him, this envelope bearing upon its face various columns adapted to have inscribed therein data regarding the sale or transaction and the various columns being headed by certain indicia.

An additional object is the provision of a system of this character which will be very accurate, which will act as a complete check to prevent error, either inadvertent or intentional, and which will greatly cut down the amount of bookkeeping necessary.

With the above and other objects and advantages in view, the invention consists in the details of construction to be hereinafter more fully described and claimed, and illustrated in the accompanying drawings in which—

Figure 1 is a plan view of the receipt blank in folded position,

Figure 2 is a similar view showing the original receipt blank torn off to expose the duplicate copy therebeneath Figure 6 is a view of a page of the route book used in the system.

Figure 3:
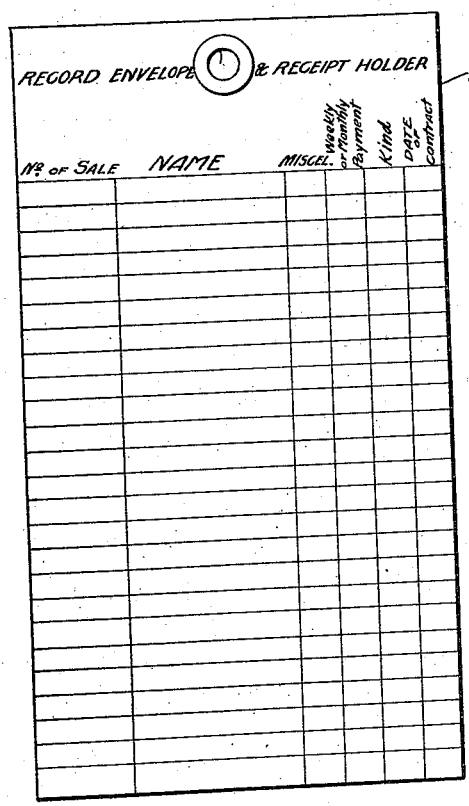
Figure 3 is a face view of the receipt holding envelope.
Figure 4:
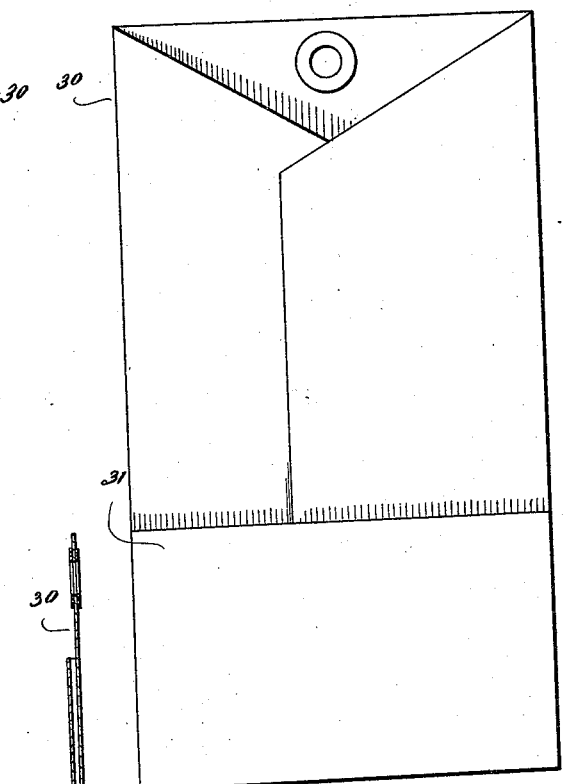
Figure 4 is a rear elevation thereof.
Figure 5:
Figure 5 is a longitudinal sectional view therethrough.

Referring more particularly to the drawings, the numeral 10 designates a receipt which is formed from a strip of paper perforated along the line 11 to define two blanks A and B of equal size and shape, the former of which is superposed upon the latter. The strip of paper is further perforated along the line 14 to define a stub 15 which extends beyond the superposed blanks A and B. This stub has ruled thereon a plurality of lines 16 above which are printed the legends "Amount brought forward," "Collected" and "Total", these legends being on the respective lines and enabling the collector to add his total as each collection is made. This stub also bears the name of the collector, or his number, and a plurality of these stubs are bound in book or pamphlet form and preferably numbered in sequence. Each blank A and B is provided with a panel 17 which is ruled into a plurality of columns above which is the legend "Case or folio number". Four of the columns 18 of this panel 17 are inscribed with the numerals running from zero to 9 and the remaining column is inscribed with letters running from A to J. It is of course understood that this panel is transversely ruled to divide the columns into different squares in which the numbers and letters above referred to are located and within each square beneath each number or letter is a space within which a punch mark may be made. Each blank A and B has inscribed thereon in spaced parallel relation to the panel 17, a panel 19 divided into vertical columns which are divided by transverse lines into squares and inscribed within these squares are numerals running from zero to 9 and adjacent the ends of the series of numerals are inscribed dollar signs, this being the case at three of the columns, the remaining two columns having inscribed at ends the legends "Dimes" and "Cents". These blanks are furthermore inscribed with other panels 20 joining onto the panels 19 and each panel 20 is divided into different squares within certain ones of which are inscribed the months of the year and within others of which are inscribed numbers designating the days of the month. Adjacent this panel 20 is the legend "Date paid". Also inscribed upon the blanks A and B at the ends of the panels 17 and 20 and extending at right angles thereto, are panels 21 each of which is divided into a plurality of columns sub-divided into squares within certain ones of which are inscribed the months of the year and within others of which are inscribed numbers designating the days of the month. Adjacent this latter panel is inscribed the legend "Date when due". Each of these blanks A and B is also provided with separate spaces 22 and 23 within which may be inscribed any desired data, as for example, a discount of allowance. The blanks A and B are also preferably inscribed with or provided with spaces within which may be written the name and address or the number of the collector.

In the filling out of the receipt the blanks A and B being superposed, the collector punches, with any desired punch, the proper squares which will indicate the date due, the date paid, the amount, and any other indicating matter which might be carried by the blanks. It is designed that the blanks A and B be separated from each other and from the stub and that one blank be given to the person making the payment and that the other be turned in at the office of the concern using the system. The stud provides a record of the transaction to be retained in the possession of the collector.

The numeral 30 designates an envelope formed on its back with a pocket 31 and this envelope is intended to be kept by the person making the payments, the pocket 31 providing storage space for the receipts retained in his possession. The front of the envelope is ruled into a plurality of columns divided by transverse lines and located at the heads of the columns are legends indicative of the number of the transaction, the amount of the payment, the character of the transaction, the date, or any other desired data which will keep the payer informed as to the condition or status of whatever transaction is involved.

The system further embraces the use of a route book to be carried by the collector or agent and this route book is provided with a plurality of similar leaves or pages indicated at 40 and each leaf is provided with columns at the heads of which are inscribed, respectively, the legends "Case number," "Folio," "Name," "Address," "Amount" and "Miscellaneous." Each page is furthermore ruled into columns and arranged in two panels, the squares in each panel being inscribed with the months of the year and the numbers of the days of the months. One of these panels 41 has inscribed thereabove the legend "Date paid" and the corresponding panel 42 has inscribed thereabove the legend "Date due." Each page is furthermore ruled to provide a panel at the head of which is the legend "Advance payment" and this panel is divided into columns 43 and 44 headed by the legends "Amount" and "Paid to." These columns 43 and 44 may be subdivided into any desired number of squares by means of transverse lines.

In the practical carrying out of the system the receipts on the blanks A are given to the payer as above described, the stubs 15 are retained by the collector to furnish the data from which he fills out the sheet 40. The blanks B after being properly punched are turned in at the home office with the route book whereupon a complete record is furnished the office which will be of such a nature that errors or falsifications will be easily and quickly detected.

From the foregoing description and a study of the drawings it will be apparent that I have thus provided an extremely simple and efficient collecting system, the different steps of which will check one another so as to attain the highest degree of accuracy.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. Means employed in a collection system, comprising duplicate receipts carrying data as to date of payments due and paid and the amount thereof, the receipts being designed for simultaneous punching at selected data indications, and a stub carried by one of the receipts and divided therefrom by a line of perforation, the receipt unprovided with the stub being folded upon the other with the free end of the former lying along said line of perforations.

2. Means employed in collection system including duplicate receipts carrying data as to the date of payments due and paid and the amount, a stub connected with one of the receipts and adapted to have inscribed thereon bookkeeping data, one receipt being retained by the payer, the duplicate being turned in with the collections, and the stub remaining in the possession of the collector, the duplicate receipts having the data thereon disposed within squares or spaces adapted to be punched, the punching of the receipts being simultaneous, said stub being divided from the associated receipt by a line of perforations, the receipt unprovided with the stub being folded upon the other with the free end of the former lying along said line of perforations.

In testimony whereof I affix my signature.

GEORGE W. BUSH.